United States Patent
Chen et al.

(10) Patent No.: US 12,306,461 B2
(45) Date of Patent: May 20, 2025

(54) DRIVING MODULE AND FOCUSING MECHANISM INCLUDING DRIVING MODULE

(71) Applicant: TRIPLE WIN TECHNOLOGY(SHENZHEN) CO.LTD., Shenzhen (CN)

(72) Inventors: Chan-Chi Chen, New Taipei (TW); Wen-Chieh Lin, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 587 days.

(21) Appl. No.: 17/836,134

(22) Filed: Jun. 9, 2022

(65) Prior Publication Data
US 2023/0067335 A1 Mar. 2, 2023

(30) Foreign Application Priority Data
Aug. 24, 2021 (CN) .......................... 202110973863.7

(51) Int. Cl.
*G02B 7/105* (2021.01)
*G02B 5/18* (2006.01)
*G02B 15/12* (2006.01)

(52) U.S. Cl.
CPC ........... *G02B 7/105* (2013.01); *G02B 5/1814* (2013.01); *G02B 15/12* (2013.01)

(58) Field of Classification Search
CPC ....... G02B 7/105; G02B 5/1814; G02B 15/12
USPC ......................................................... 359/673
See application file for complete search history.

(56) References Cited

U.S. PATENT DOCUMENTS

| 8,134,116 B2* | 3/2012 | Nunnink | G02B 3/14 250/234 |
| 2009/0051929 A1* | 2/2009 | Koh | G01B 11/2518 356/602 |
| 2013/0062414 A1* | 3/2013 | Anselment | G06K 7/10811 359/823 |
| 2019/0265432 A1* | 8/2019 | Kawanabe | G02B 7/003 |

FOREIGN PATENT DOCUMENTS

| CN | 107990842 A | 5/2018 |
| CN | 112346199 A | 2/2021 |

* cited by examiner

*Primary Examiner* — Sharrief I Broome
(74) *Attorney, Agent, or Firm* — ScienBiziP, P.C.

(57) ABSTRACT

A driving module configured for driving a teleconverter lens assembly to move up and down with precision includes a mounting base, a driving assembly connected with the mounting base, and an optical grating sensor. The driving assembly includes a linear motor adapted to be fixedly connected with the teleconverter lens assembly and configured to drive the teleconverter lens assembly to move, and an air cylinder configured to support the teleconverter lens assembly. The optical grating sensor is electrically connected with the linear motor and configured to detect and feedback a position of the teleconverter lens assembly driven by the linear motor in real time. A focusing mechanism including the driving module is also disclosed.

17 Claims, 5 Drawing Sheets

DRIVING MODULE AND FOCUSING MECHANISM INCLUDING DRIVING MODULE

FIELD

The subject matter herein generally relates to focusing devices for lens modules, and more particularly to a driving module for driving a teleconverter lens of a focusing mechanism, and a focusing mechanism including the driving module.

BACKGROUND

Before a lens module is assembled during manufacture, a focusing mechanism is employed to adjust a distance between a lens and a sensor to enable a focal area of the lens to be aligned to a sensing area of the sensor. At present, a teleconverter lens is used in the focusing mechanism to reduce a space occupied by the focusing mechanism. The teleconverter is generally driven by a ball screw and a servo motor. However, due to the limitations of the machining accuracy and assembly accuracy of the ball screw, it is difficult to achieve a desired accuracy of focusing.

BRIEF DESCRIPTION OF THE DRAWINGS

Implementations of the present technology will now be described, by way of embodiment, with reference to the attached figures.

DETAILED DESCRIPTION

Figure 1:
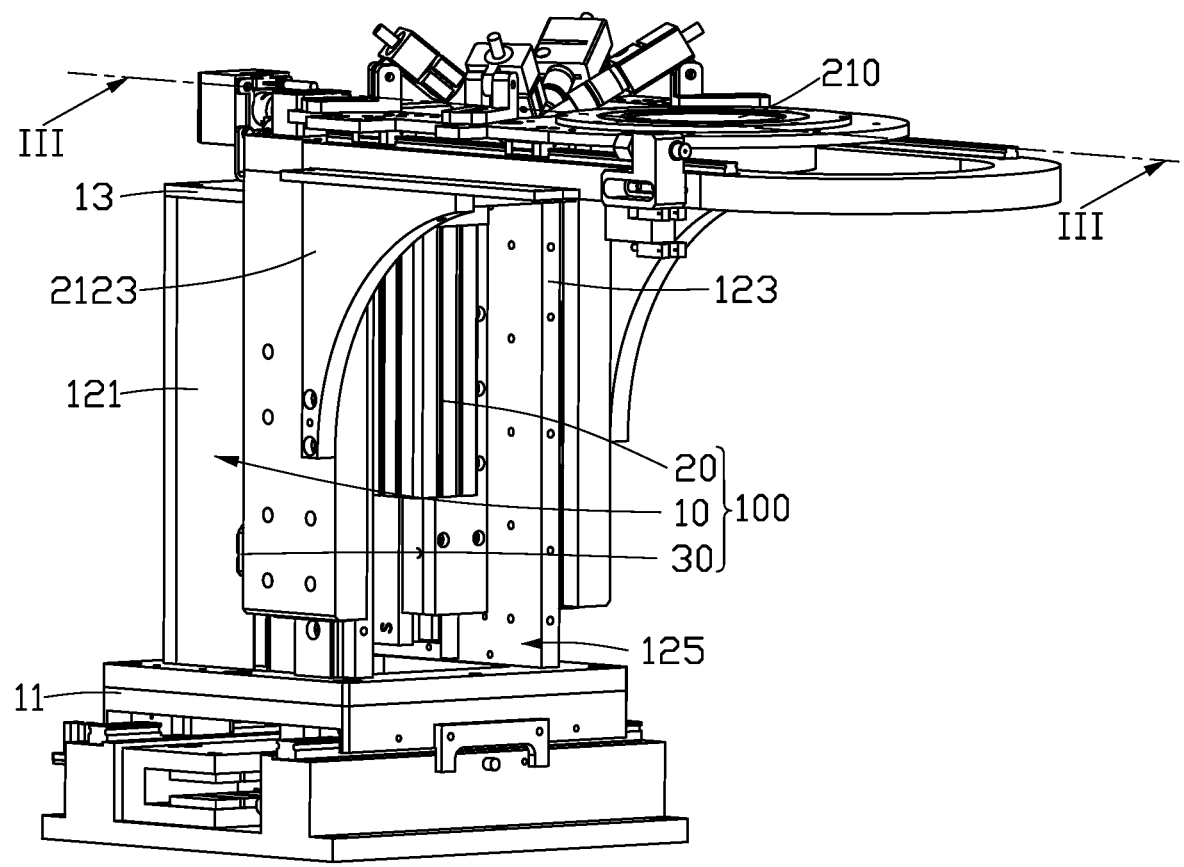
FIG. 1 is a perspective view of a focusing mechanism according to an embodiment of the present disclosure.

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

The terminology used herein is for the purpose of describing particular exemplary embodiments only and is not intended to be limiting of the disclosure. As used herein, when a first component is referred to as "fixed to" a second component, it is to indicate that the first component may be directly fixed to the second component or may be indirectly fixed to the second component via a third component between them. When a first component is referred to as "connecting" to a second component, it is to indicate that the first component may be directly connected to the second component or may be indirectly connected to the second component via a third component between them. When a first component is referred to as "disposed to" a second component, it is intended that the first component may be directly disposed to the second component or may be indirectly disposed to the second component via a third component between them.

Unless otherwise defined, all terms used herein have the same meaning as commonly understood by one of ordinary skill in the art to which this disclosure belongs. It will be further understood that terms such as those defined in commonly used dictionaries should be interpreted as having a meaning that is consistent with their meaning in the context of the relevant art and the present disclosure, and are not to be interpreted in an idealized or overly formal sense unless expressly so defined herein.

Figure 2:
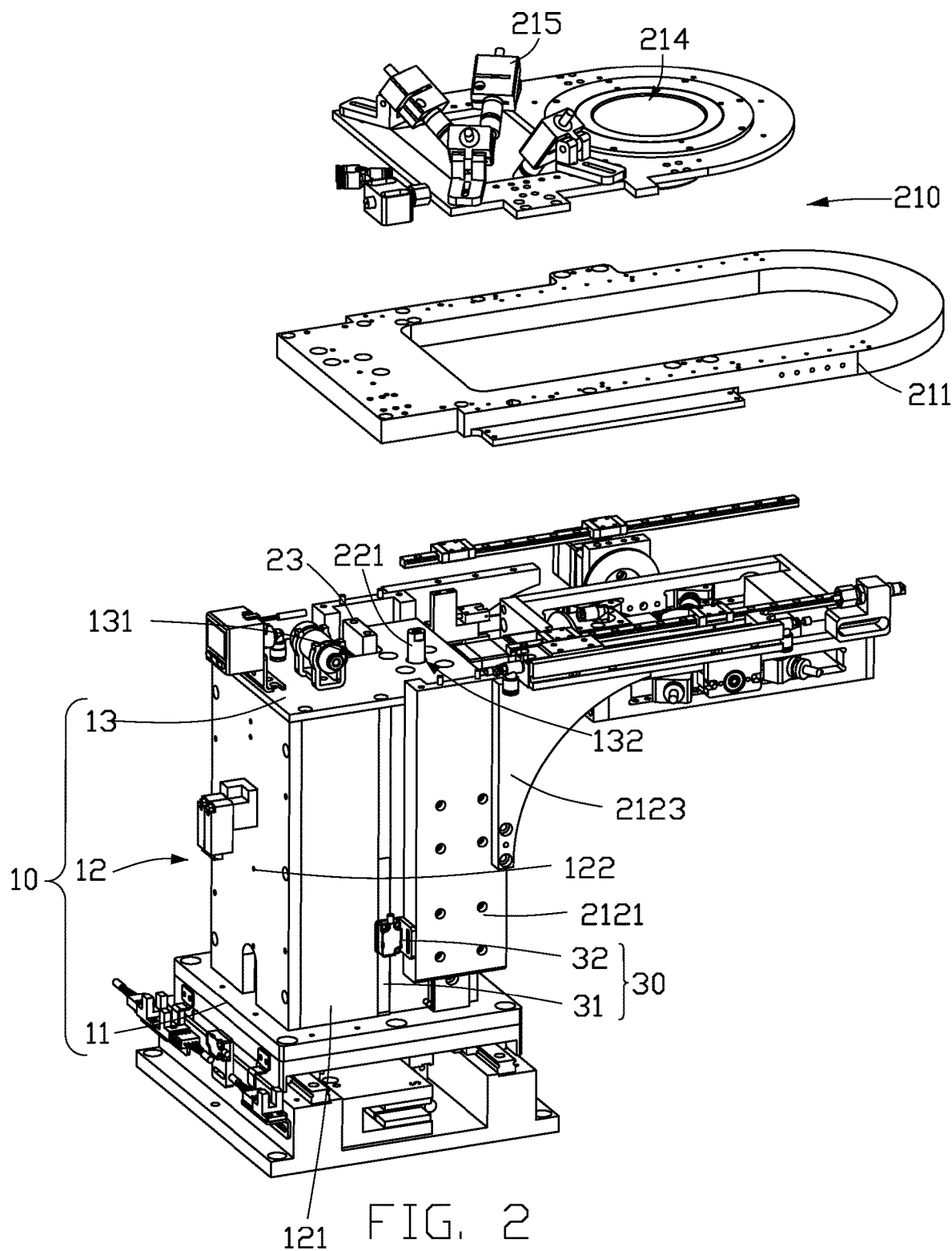
FIG. 2 is an exploded view of the focusing mechanism of FIG. 1.
Figure 3:
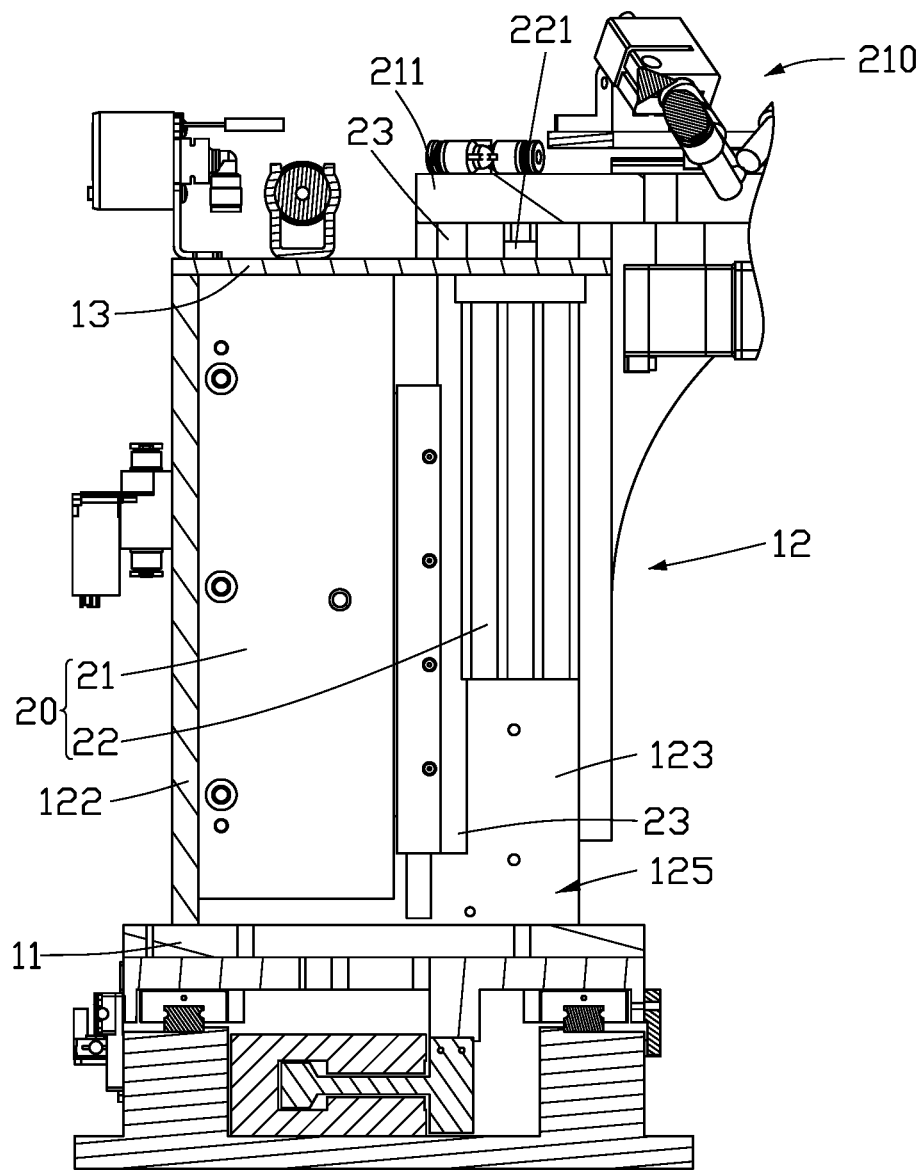
FIG. 3 is a cross-sectional view along line of FIG. 1.

Referring to FIGS. 1 to 3, an embodiment of a focusing mechanism 200 is provided. The focusing mechanism 200 is configured for adjusting a distance between a lens and a sensor of a lens module to enable a focal area of the lens to be aligned to a sensing area of the sensor. The focusing mechanism 200 includes a teleconverter lens assembly 210 and a driving module 100. The driving module 100 is configured to drive the teleconverter lens assembly 210 to move up and down. The driving module 100 includes a mounting base 10, a driving assembly 20, and an optical grating sensor 30. The driving assembly 20 is disposed on the mounting base 10 and includes a linear motor 21 and an air cylinder 22. Each of the linear motor 21 and the air cylinder 22 is connected with the teleconverter lens assembly 210. The linear motor 21 is configured to drive the teleconverter lens assembly 210 to move. The air cylinder 22 supports the teleconverter lens assembly 210. The optical grating sensor 30 is disposed on the mounting base 10 and is electrically connected with the linear motor 21. The optical grating sensor 30 detects and feeds back a position of the teleconverter lens assembly 210 driven by the linear motor 21 in real time.

Referring to FIGS. 1 and 2, in some embodiment, the mounting base 10 includes a base plate 11, a support frame 12 disposed on the base plate 11, and a top plate 13 disposed on a side of the support frame 12 away from the base plate 11. The support frame 12 includes a first plate 121, a second plate 122, and a third plate 123. The first plate 121 is opposite to the third plate 123, and the second plate 122 is disposed between the first plate 121 and the third plate 123. The top plate 13 is fixed on the first plate 121, the second plate 122, and the third plate 123. The base plate 11, the first plate 121, the second plate 122, the third plate 123, and the top plate 13 enclose an accommodation chamber 125 with an opening. The air cylinder 22 and the linear motor 21 are disposed in the accommodation chamber 125 and are spaced from each other. The teleconverter lens assembly 210 is disposed above the top plate 13.

Referring to FIGS. 2 and 3, in some embodiments, the linear motor 21 is mounted on the third plate 123. A transmission plate 23 is fixed on the linear motor 21. The transmission plate 23 may be fixed to the linear motor 21 by bolts. The transmission plate 23 moves linearly with the linear motor 21 along a direction from the base plate 11 to the top plate 13. The top plate 13 defines a first through hole 131. The transmission plate 23 extends through the first through hole 131 and is fixedly connected with the teleconverter lens assembly 210. The linear motor 21 drives the transmission plate 23 to move up and down, and then drives the teleconverter lens assembly 210 to move up and down.

Referring to FIG. 2, the optical grating sensor 30 includes a grating ruler 31 and a grating reading head 32 electrically connected with the grating ruler 31. The grating ruler 31 is fixed on a surface of the first plate 121 away from the accommodation chamber 125. A length direction of the grating ruler 31 is set as the direction from the base plate 11 to the top plate 13. The length direction of the grating ruler 31 is consistent with a moving direction of the teleconverter lens assembly 210 driven by the linear motor 21. The grating reading head 32 is fixed on the teleconverter lens assembly 210. The grating reading head 32 moves with the teleconverter lens assembly 210 and reads a position of the teleconverter lens assembly 210 relative to the grating ruler 31, so as to read a moving distance of the teleconverter lens assembly 210. Through the cooperation of the grating reading head 32 and the grating ruler 31, the moving distance of the teleconverter lens assembly 210 driven by the linear motor 21 can be accurately controlled, so that the accuracy of focusing of the teleconverter lens assembly 210 can reach nanometer level.

Referring to FIGS. 2 and 3, in some embodiments, the air cylinder 22 is disposed on the top plate 13. The top plate 13 further defines a second through hole 132, and a piston rod 211 of the air cylinder 22 extends through the second through hole 132 and is fixedly connected with the teleconverter lens assembly 210. During the moving of the teleconverter lens assembly 210, the air cylinder 22 always supports the teleconverter lens assembly 210 and provides a supporting force equal to a weight of the teleconverter lens assembly 210, so that there is approximately zero loading on the linear motor 21 driving the teleconverter lens assembly 210 to move, reducing a working power consumption of the linear motor 21. Therefore, the heat generated by the linear motor 21 is reduced, reducing heat transmitted to the teleconverter lens assembly 210 through the transmission plate 23, so that the accuracy of focusing of the teleconverter lens assembly 210 is further improved.

Figure 4:
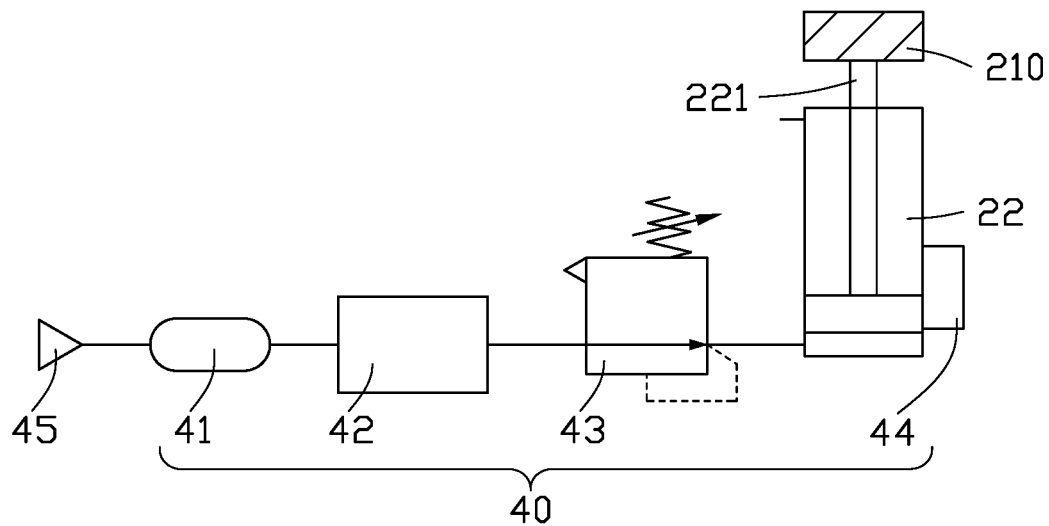
FIG. 4 is a schematic structural diagram of a connection between a cylinder and an air pressure regulator of the focusing mechanism of FIG. 1.

Referring to FIGS. 3 and 4, in some embodiments, an air pressure regulator 40 is connected with the air cylinder 22. The air pressure regulator 40 is configured to adjust a pressure in the air cylinder 22 to provide supporting forces balanced with the weight of the teleconverter lens assembly 210 at different heights, or to provide different supporting forces which are balanced with weights of different teleconverter lens assemblies 210. The air pressure regulator 40 includes an air reservoir 41, an air filter 42, a pressure regulating valve 43, and a pressure sensor 44. The pressure sensor 44 is connected with the air cylinder 22 and is configured to detect and feedback data as to the pressure in the air cylinder 22. The quantity of gas in the air cylinder 22 can be adjusted through the pressure regulating valve 43 to change the pressure in the cylinder 22. Therefore, the supporting force provided by the air cylinder 22 is adjustable. The air reservoir 41, the air filter 42, and the pressure regulating valve 43 are connected in turn. One end of the air reservoir 41 is connected with an air source 45. The air filter 42 is configured to filter the air flowing from the air reservoir 41 to the air cylinder 22, to prevent impurities in the air from affecting the sensitivity of the pressure regulating valve 43. In some embodiments, the regulating valve 43 is a precision pressure regulating valve.

The air cylinder 22 always provides a support force to the teleconverter lens assembly 210, which can prevent the teleconverter lens assembly 210 from moving freely under the action of gravity when the linear motor 21 is stopped due to power failure or misoperation. Therefore, this arrangement of the air cylinder 22 improves safety.

In some embodiments, the linear motor 21 is a coreless linear motor, which has a large surface area for heat dissipation, reducing the heat transferred to the teleconverter lens assembly 210.

Figure 5:
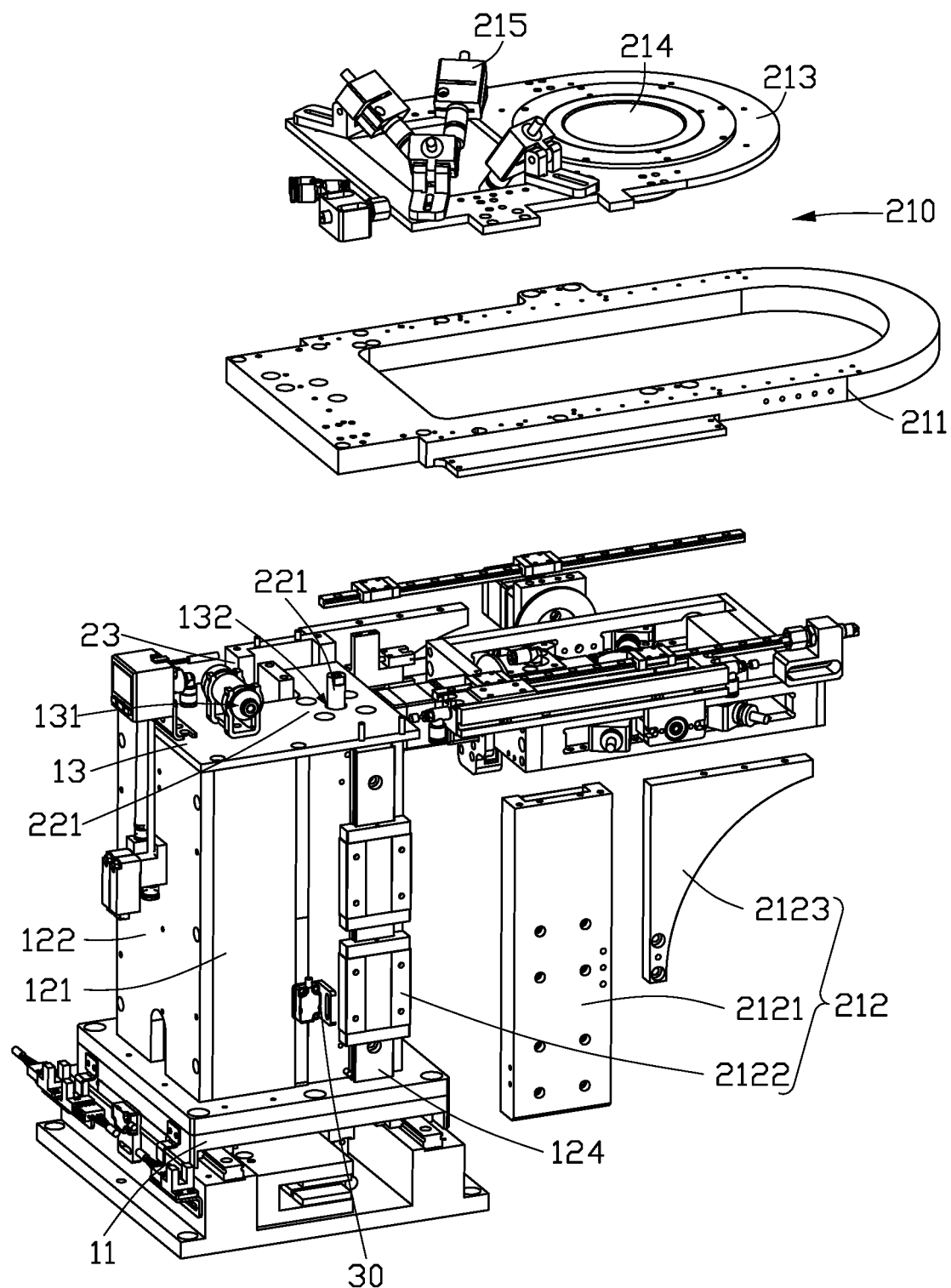
FIG. 5 is an exploded view of a sliding member of the focusing mechanism of FIG. 1.

Referring to FIGS. 1 and 5, the teleconverter lens assembly 210 includes a first bearing plate 211, a sliding member 212, a second bearing plate 213, and a teleconverter lens 214. The first bearing plate 211 is disposed above the top plate 13, and the transmission plate 23 and the piston rod 221 of the air cylinder 22 are both fixedly connected with the first bearing plate 211. The second bearing plate 213 is fixedly connected with the first bearing plate 211, and the teleconverter lens 214 is mounted on the second bearing plate 213. The sliding member 212 is disposed on a side of the first bearing plate 211. In one embodiment, two sliding members 212 are disposed on opposite sides of the first bearing plate 211. Each sliding member 212 includes a fixing plate 2121 and a sliding block 2122 connected with the fixing plate 2121. The grating reading head 32 is fixed on the fixing plate 2121 of one sliding member 212. Each of the first plate 121 and the third plate 123 is provided with a sliding rail 124. The sliding block 2122 is slidably disposed on the sliding rail 124. The fixing plate 2121 is vertically connected with the first bearing plate 211. A reinforcing plate 2123 is fixedly connected with the fixing plate 2121 and the first bearing plate 211. In one embodiment, the reinforcing plate 2123 is triangular, and the fixing plate 2121 and the first bearing plate 211 are fixed onto the same surface of the reinforcing plate 2123.

In one embodiment, the focusing mechanism 100 further includes a curing member 215. The curing member 215 is disposed on the second bearing plate 213 and is used to cure adhesive used in the assembly of the lens module. The curing member 215 may be an ultraviolet lamp.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A driving module configured for driving a teleconverter lens assembly to move in reciprocal directions, the driving module comprising: a mounting base; a driving assembly connected with the mounting base and comprising: a linear motor adapted to be fixedly connected with the teleconverter lens assembly, the linear motor being configured to drive the teleconverter lens assembly to move in the reciprocal directions; and an air cylinder configured to support the teleconverter lens assembly; and an optical grating sensor electrically connected with the linear motor and configured to detect and feedback a position of the teleconverter lens assembly driven by the linear motor in real time.

2. The driving module of claim 1, wherein the optical sensor comprises a grating ruler and a grating reading head electrically connected with the grating ruler, the grating ruler is disposed on the mounting base, a length direction of the grating ruler is consistent with a moving direction of the teleconverter lens assembly, the grating reading head is configured to read a position of the teleconverter lens assembly relative to the grating ruler.

3. The driving module of claim 1, further comprising an air pressure regulator, wherein the air pressure regulator is connected with the air cylinder and comprises an air reservoir and a pressure regulating valve connected between the air reservoir and the air cylinder.

4. The driving module of claim 3, wherein the air pressure regulator further comprises an air filter connected between the air reservoir and the pressure regulating valve.

5. The driving module of claim 4, wherein the air pressure regulator further comprises a pressure sensor connected with the air cylinder.

6. The driving module of claim 1, wherein the mounting base comprises a base plate, a support frame disposed on the base plate, and a top plate disposed on a side of the support frame away from the base plate, the air cylinder is disposed on the top plate, and a piston rod of the air cylinder extends through the top plate and is configured for supporting the teleconverter lens assembly.

7. The driving module of claim 6, further comprising a transmission plate, wherein the linear motor is disposed on the support frame, the transmission plate is fixedly connected with the linear motor, and end of the transmission plate extends through the top plate for connecting the teleconverter lens assembly.

8. The driving module of claim 1, wherein the linear motor is a coreless linear motor.

9. A focusing mechanism comprising:
a teleconverter lens assembly; and
a driving module configured for driving a teleconverter lens assembly to move in reciprocal directions, the driving module comprising:
  a mounting base;
  a driving assembly connected with the mounting base and comprising:
    a linear motor fixedly connected with the teleconverter lens assembly, the linear motor being configured to drive the teleconverter lens assembly to move in the reciprocal directions; and
    an air cylinder supporting the teleconverter lens assembly; and
  an optical grating sensor electrically connected with the linear motor and configured to detect and feedback a position of the teleconverter lens assembly driven by the linear motor in real time.

10. The focusing mechanism of claim 9, wherein the teleconverter lens assembly comprises a bearing plate, a teleconverter lens disposed on the bearing plate, and a sliding member connected with the bearing plate, each of the linear motor and the air cylinder is fixedly connected with the bearing plate, the sliding member is slidably disposed on the mounting base and connected with the bearing plate.

11. The focusing mechanism of claim 9, wherein the optical sensor comprises a grating ruler and a grating reading head electrically connected with the grating ruler, the grating ruler is disposed on the mounting base, a length direction of the grating ruler is consistent with a moving direction of the teleconverter lens assembly, the grating reading head is configured to read a position of the teleconverter lens assembly relative to the grating ruler.

12. The driving module of claim 9, wherein the driving module further comprises an air pressure regulator, the air pressure regulator is connected with the air cylinder and comprises an air reservoir and a pressure regulating valve connected between the air reservoir and the air cylinder.

13. The focusing mechanism of claim 12, wherein the air pressure regulator further comprises an air filter connected between the air reservoir and the pressure regulating valve.

14. The focusing mechanism of claim 13, wherein the air pressure regulator further comprises a pressure sensor connected with the air cylinder.

15. The focusing mechanism of claim 9, wherein the mounting base comprises a base plate, a support frame disposed on the base plate, and a top plate disposed on a side of the support frame away from the base plate, the air cylinder is disposed on the top plate, and a piston rod of the air cylinder extends through the top plate and is configured for supporting the teleconverter lens assembly.

16. The focusing mechanism of claim 15, wherein the driving module further comprises a transmission plate, the linear motor is disposed on the support frame, the transmission plate is fixedly connected with the linear motor, and end of the transmission plate extends through the top plate for connecting the teleconverter lens assembly.

17. The focusing mechanism of claim 9, wherein the linear motor is a coreless linear motor.

* * * * *